(12) United States Patent
Maguire et al.

(10) Patent No.: US 11,039,701 B2
(45) Date of Patent: Jun. 22, 2021

(54) SPILL-PROOF LID FOR DRINKING VESSEL

(71) Applicant: Evergreen Enterprises of Virginia, LLC, Richmond, VA (US)

(72) Inventors: Paul D. Maguire, Goochland, VA (US); Ting Xu, Richmond, VA (US)

(73) Assignee: EVERGREEN ENTERPRISES OF VIRGINIA, LLC, Richmond, VA (US)

( * ) Notice: Subject to any disclaimer, the term of this patent is extended or adjusted under 35 U.S.C. 154(b) by 138 days.

(21) Appl. No.: 16/154,460

(22) Filed: Oct. 8, 2018

(65) Prior Publication Data

US 2019/0159615 A1    May 30, 2019

Related U.S. Application Data

(60) Provisional application No. 62/592,754, filed on Nov. 30, 2017.

(51) Int. Cl.
*A47G 19/22* (2006.01)
*B65D 47/24* (2006.01)
*B65D 47/06* (2006.01)

(52) U.S. Cl.
CPC ....... *A47G 19/2272* (2013.01); *B65D 47/243* (2013.01); *B65D 47/06* (2013.01); *B65D 2543/00046* (2013.01)

(58) Field of Classification Search
CPC ............ A47G 19/2272; A47G 19/2266; B65D 47/243; B65D 47/248; B65D 47/0866; B65D 25/38; B65D 39/0052; B65D 39/007; B65D 39/0076; B65D 39/04; B65D 39/043; B65D 39/20; B65D 39/2018

USPC ........ 220/714, 715, 719, 703, 704, 711, 713
See application file for complete search history.

(56) References Cited

U.S. PATENT DOCUMENTS

| | | | | |
|---|---|---|---|---|
| 2,669,370 A | * | 2/1954 | Royall, Jr. ............. | B65D 39/04 215/355 |
| 2,800,241 A | * | 7/1957 | Brune ................... | B65D 47/18 215/309 |
| 2,872,060 A | * | 2/1959 | Brune ................ | B65D 39/0029 215/364 |
| 3,595,421 A | * | 7/1971 | Sanchis .................. | B65D 47/06 215/309 |
| 4,184,603 A | * | 1/1980 | Hamilton, Sr. .... | A47G 19/2272 220/254.5 |
| 5,749,491 A | * | 5/1998 | Wylder .............. | A47G 19/2211 215/387 |
| 5,979,689 A | * | 11/1999 | Lansky .............. | A47G 19/2272 220/255 |
| 6,202,877 B1 | * | 3/2001 | La Torre ............ | A47G 19/2272 220/254.1 |
| 6,536,618 B1 | * | 3/2003 | Hwang .................. | B65D 39/04 215/358 |
| 6,588,622 B1 | * | 7/2003 | Leishman .............. | B65D 23/00 215/306 |

(Continued)

*Primary Examiner* — Robert Poon
(74) *Attorney, Agent, or Firm* — Jordan IP Law, LLC; Todd A. Vaughn

(57) ABSTRACT

A reusable, spill-proof lid for a drinking vessel. The lid has a cap member that is selectively moveable between a seated position to form an inner seal, and an unseated position that forms a gap that facilitates drinking of liquid contents from the drinking vessel. The lid is particularly moveable from the seated position to the unseated position via a downwardly directed force applied by the upper lip of a user.

11 Claims, 9 Drawing Sheets

(56) References Cited

U.S. PATENT DOCUMENTS

| | | | |
|---|---|---|---|
| 8,453,870 B2 | 6/2013 | Berg | |
| 2004/0040962 A1* | 3/2004 | Bielecki | A47G 19/2272 220/254.1 |
| 2005/0056653 A1* | 3/2005 | Miller | A47G 19/2272 220/710.5 |
| 2009/0159595 A1* | 6/2009 | Michaelian | A47G 19/2272 220/260 |
| 2009/0250461 A1* | 10/2009 | Syrkos | B65D 47/248 220/254.1 |
| 2010/0200602 A1* | 8/2010 | Chan | A47G 19/2272 220/714 |
| 2012/0241453 A1* | 9/2012 | Palmer | B65D 47/06 220/254.3 |
| 2013/0240547 A1* | 9/2013 | Osinga | A47G 19/2272 220/714 |
| 2015/0102032 A1 | 4/2015 | Dunn et al. | |
| 2017/0275062 A1* | 9/2017 | Cudworth | F16K 15/144 |

* cited by examiner

SPILL-PROOF LID FOR DRINKING VESSEL

CROSS-REFERENCE TO RELATED APPLICATIONS

The present application claims priority to U.S. Provisional Patent Publication No. 62/592,754 (filed on Nov. 30, 2017), which is hereby incorporated by reference in its complete entirety.

TECHNICAL FIELD

Embodiments relate to a lid, and particularly, a reusable, spill-proof lid for a drinking vessel. The lid has a cap member that is selectively moveable between a seated position to form an inner seal, and an unseated position that forms a gap that facilitates drinking of liquid contents from the drinking vessel. The lid is particularly moveable from the seated position to the unseated position via a downwardly directed force applied by the upper lip of a user.

BACKGROUND

While spill-proof and mouth-openable lids are currently available, there exists a need for a spill-proof lid that opens at the point where the user's mouth contacts the lid and does not require the user to place their mouth in a specific location along the lid. There also exists a need for a spill-proof and mouth-openable lid that is adaptable to seal vessels having a variety of structural dimensions and which may be composed of a variety of materials. There further exists a need for a spill-proof and mouth-openable lid that does not require mechanical connections such as threads for screwing onto the vessel for attachment. Moreover, there exists a need for a spill-proof and mouth-openable lid that will create an effective seal for drinking vessels, even where the manufacturing process produces vessels that contain slight dimensional variations.

SUMMARY

In accordance with embodiments, a drinking lid that is spill-proof and moveable from a seated position to at least a partially unseated position at any point along an outer peripheral edge or rim thereof in response to a force applied by a user, and particularly, from a force applied by the upper lip of the user. The lid returns to the seated position immediately upon removal of the force, thereby completely sealing the vessel.

In accordance with embodiments, a drinking lid is configured to effectively seal a corresponding drinking vessel that may overcome manufacturing tolerances in having dimensional variations, and does not require twisting or screwing to attach to the vessel.

In accordance with embodiments, a drinking lid that is configured to seal a variety of drinking vessels without requiring matching internal or external threading.

Embodiments relate to a drinking lid may that may comprise at least one of: a cap member composed of a rigid material; and a sealing member that is operatively connected to the cap member so as to form a unitary lid arrangement that is configured for attachment to a drinking vessel to seal the liquid contents of the vessel when in a seated position and, when selectively placed in an unseated position, facilitates drinking of the liquid contents contained in the vessel.

In accordance with embodiments, the cap member has an exterior surface, an outer rim, an interior shelf, and a support member.

In accordance with embodiments, the sealing member has a lower rim, an interior step, at least one sealing ring, and a tension web. The tension web comprises a central web surface seal having a plurality of web extensions extending therefrom. The tension web is composed of a material that facilitates stretching and/or flexing when a force is applied thereto. When the cap member and the sealing member are connected together, the support member of the cap member is to directly contact the central web surface, thereby causing the tension web to stretch or flex. The tension web resists back against the support member in response, which causes a sealing of the cap member against the sealing member to keep the liquid contents contained in the drinking vessel from leaking and/or spilling.

In accordance with embodiments, the cap member may be composed of a variety of materials that will provide the cap member with adequate stiffness. Such materials may, for example, include plastics, metals, ceramics, composites, combinations thereof, or any material(s) thereof that fall within the spirit and scope of the principles of this disclosure. The exterior surface of the cap member may be planar or flat, or may include ridges, textural indentations, or any three-dimensional feature(s). The exterior surface may also feature one or more decorative elements and/or aesthetic elements. The support member of the cap member may be hollow or solid.

In accordance with embodiments, the sealing member may be composed of a material(s) that will provide the seal member with adequate flexibility. Such materials may, for example, comprise polymers, composites, combinations thereof, or any material(s) thereof that fall within the spirit and scope of the principles of this disclosure. In one example, the seal member may be composed of silicone rubber. Embodiments, however, are not limited thereto and may encompass other types of materials that facilitate flexing of the at least one sealing ring and the tension webbing.

In accordance with embodiments, the at least one sealing ring of the sealing member has a plurality of sealing rings that are spaced apart from each other, and configured to secure the lid to a drinking vessel by contacting and gripping the interior wall of the vessel when the lid is placed in an operating position on the vessel (e.g., by applying a downwardly directed force on the lid towards the vessel). The tension web of the sealing member retains its shape until the support member exerts a force onto the central web surface in response to a force at a point on the outer rim of the cap, which causes the web to stretch outwardly.

In operation, to permit drinking from the vessel via the lid, a user may apply a force exerted by the upper lip of the user at any point along an outer peripheral edge or rim of the lid. At the same time, the lower lip of the user will contact the lower rim of the sealing member. The force applied by the upper lip of the user creates a force at the point of contact on the outer peripheral edge, and the force is directed downwardly through the support member, causing the support member to move in a downward direction towards the central web surface of the tension web. The support member then contacts and exerts a force on the central web surface.

The flexible nature of the tension web permits the web to stretch and/or flex in response to this force, permitting the cap member to move from a seated position to an unseated position. When the cap member is in the unseated position, a gap is formed in the lid. This gap opens the drinking vessel so that the liquid content in the vessel may flow from the vessel, through the gap, and directly into the mouth of the user mouth with a gradual tipping of the vessel toward the mouth. When the user removes their mouth from the lid, the tension web immediately resumes its unstretched shape, thereby pushing back on the support member and causing the cap to resume its seated position, thereby sealing the vessel.

The drinking lid in accordance with embodiments uses fewer structural components than conventional designs that facilitate an ease in assembly and disassembly for thorough cleaning. This permits reuse of the lid.

DRAWINGS

Embodiments will be illustrated by way of example in the drawings and explained in the description below.

DESCRIPTION

Figure 1:
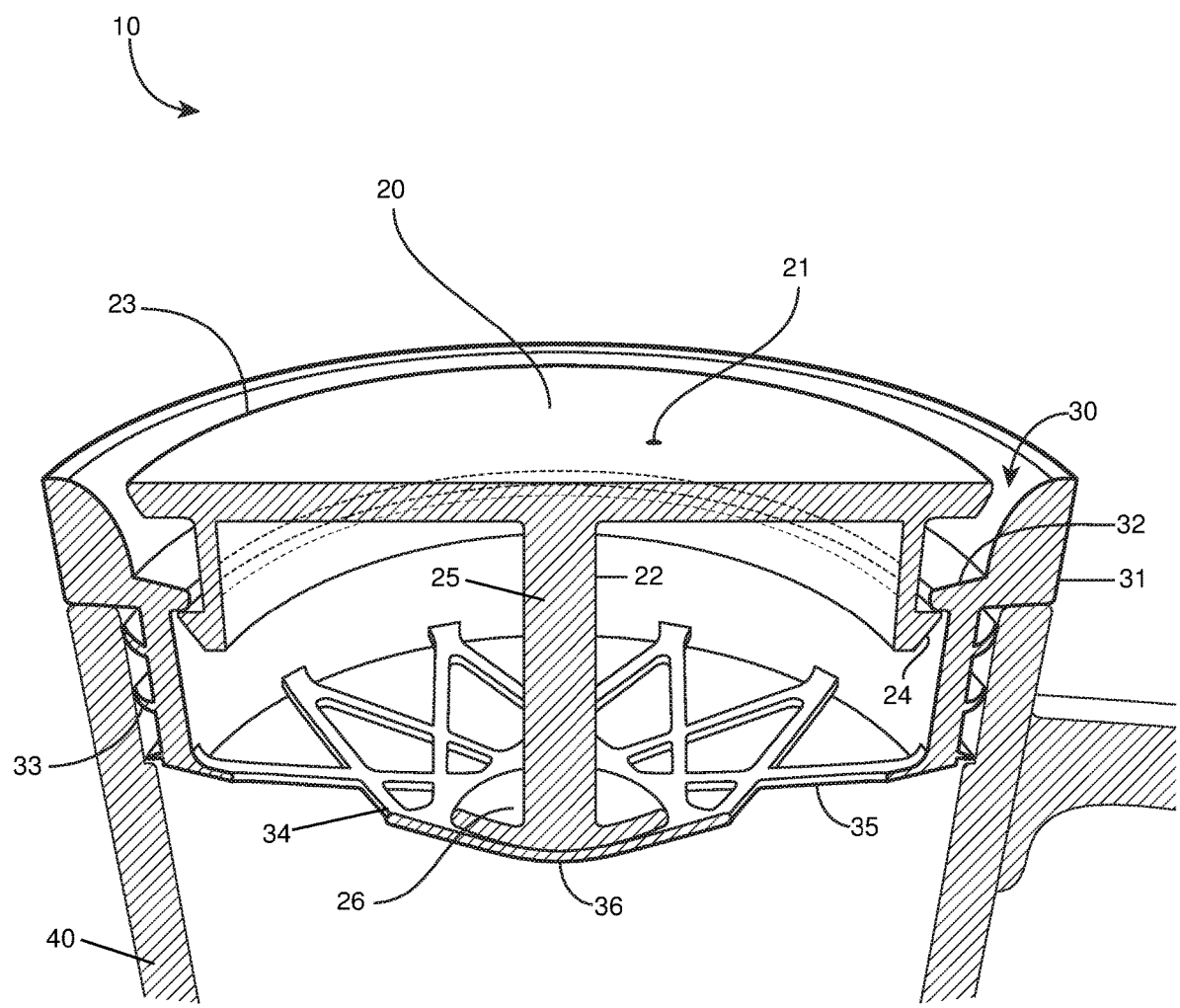
FIG. 1 illustrates a perspective sectional view of a lid, in accordance with embodiments, with the lid in an operating position on a drinking vessel, the lid having a seal member and a cap member in a seated/sealed position relative to the seal member.
Figure 2:
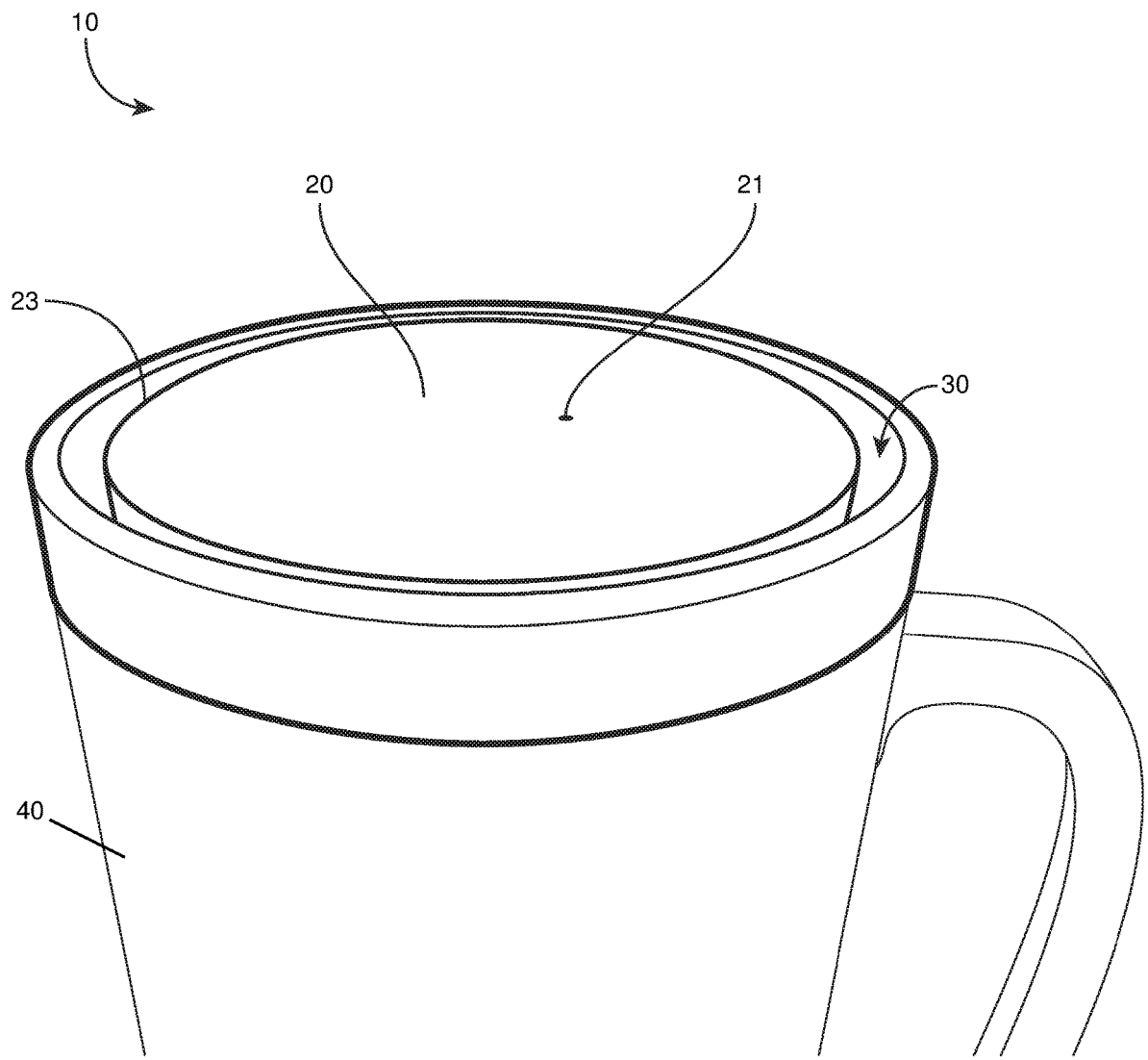
FIG. 2 illustrates a perspective view of the lid of FIG. 1.
Figure 5:
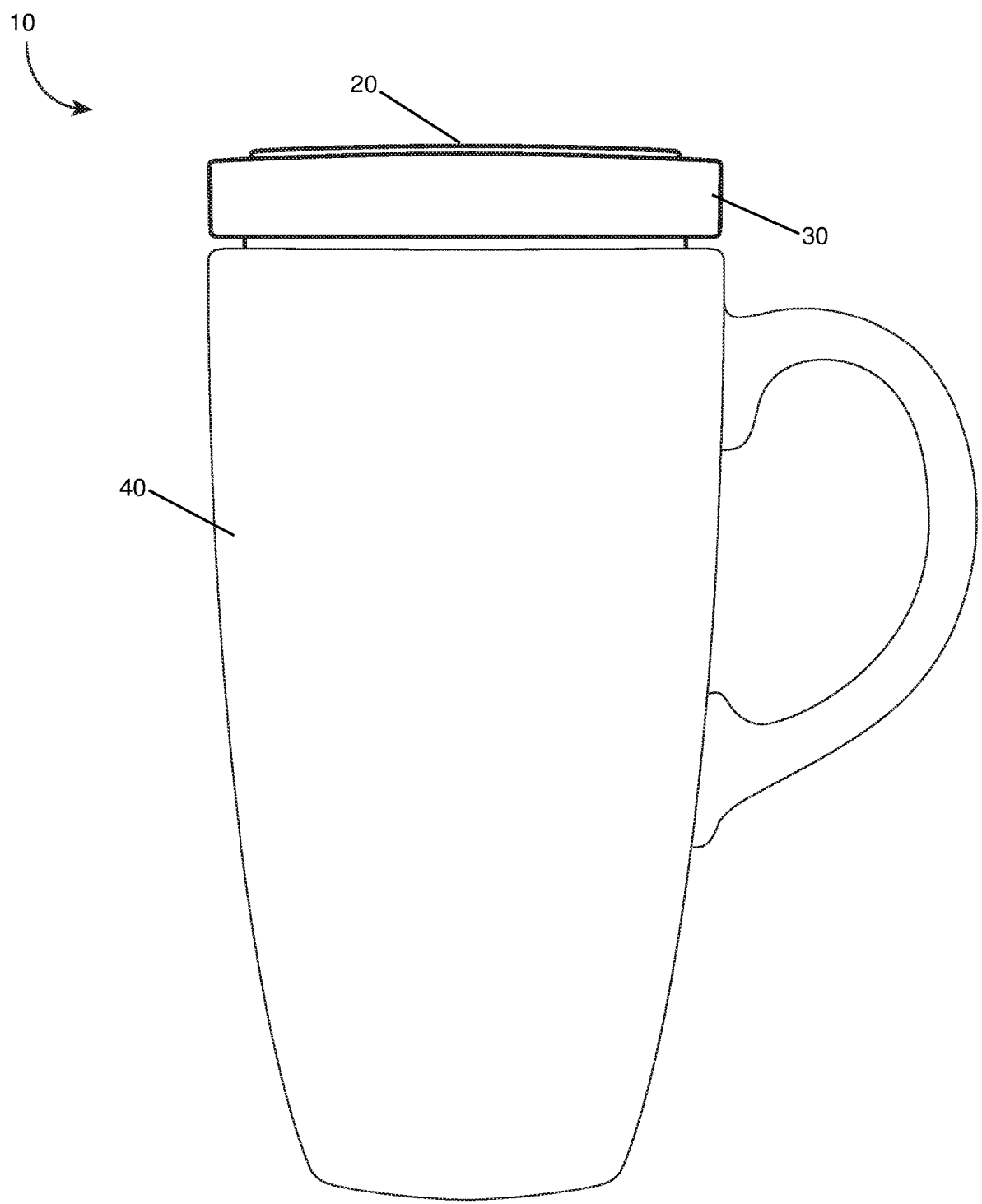
FIG. 5 illustrates a side view of the lid of FIG. 1 attached to a drinking vessel.
Figure 8:
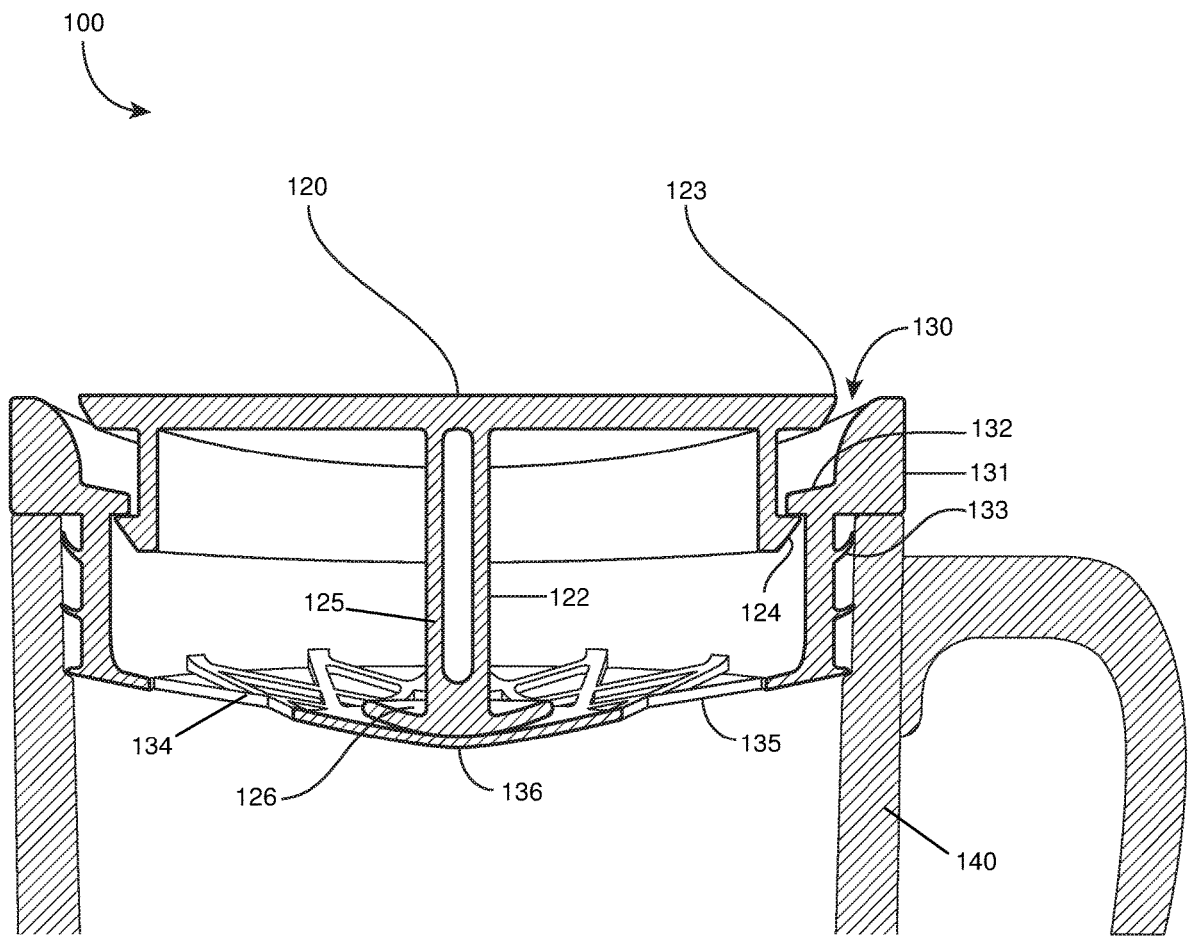
FIG. 8 illustrates a side sectional view sectional view of a lid, in accordance with embodiments, with the lid in an operating position on a drinking vessel, the lid having a seal member and a cap member in a seated/sealed position relative to the seal member.

As illustrated in FIGS. 1, 5, and 8, a reusable and spill-proof lid 10 in accordance with embodiments is configured for removeable attachment to a drinking vessel 40 that defines a container to receive liquid content. The lid 10 comprises a cap member 20 and a sealing member 30. The cap member 20 is operatively connected to the sealing member 30 for movement between a seated position and an unseated position. In the seated position, the cap member 20 is to seal liquid contents in the drinking vessel 40. In the unseated position, the cap member 20 is to facilitate flow of the liquid contents from the drinking vessel 40.

In accordance with embodiments, the cap member 20 comprises a ventilation hole 21, a support member 22, an outer rim 23, and an interior shelf 24. The outer rim 23 and the interior shelf 24 are spaced apart and extend substantially concentrically in a generally circular manner. The outer rim 23 and the interior shelf 24 may comprise the same outer diameter, or alternatively, may have different outer diameters.

Figure 3:
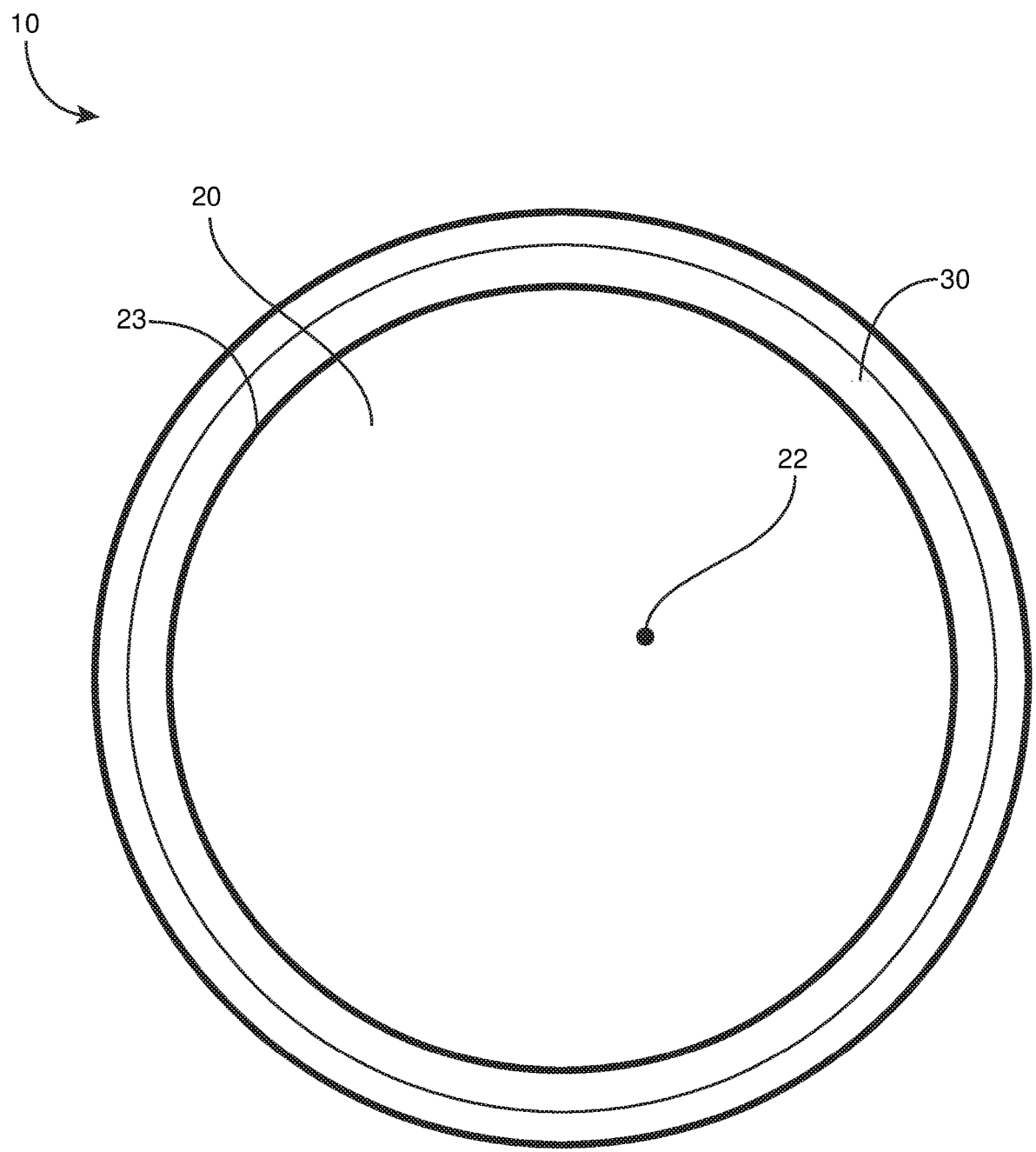
FIG. 3 illustrates a top view of the lid of FIG. 1.
Figure 4:
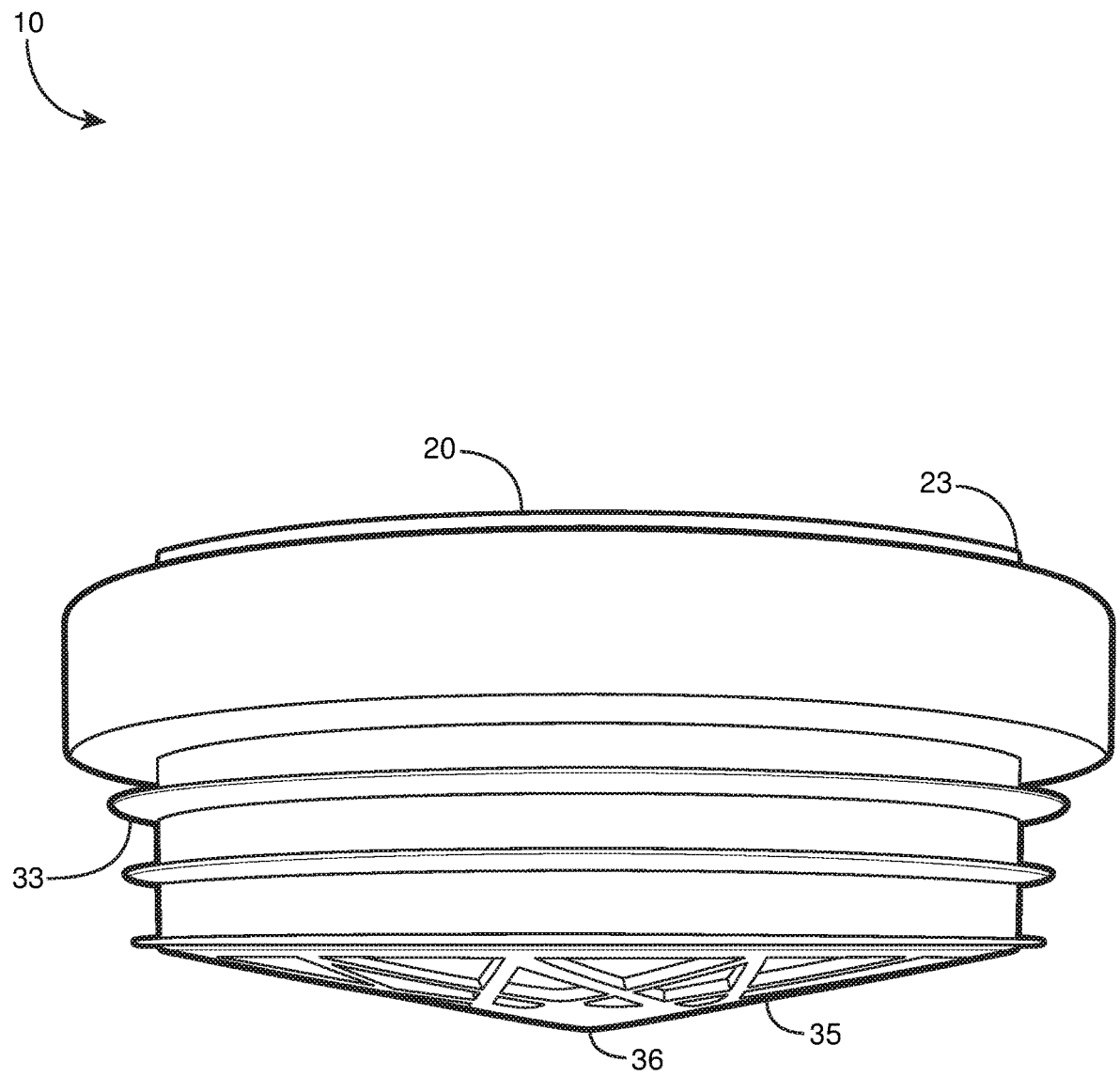
FIG. 4 illustrates a side view of the lid of FIG. 1.

As illustrated in FIG. 3, the ventilation hole 21 is configured to permit ventilation of the interior space of the drinking vessel 40. For example, should the drinking vessel 40 contain hot liquid contents, the ventilation hole 21 facilitates a flow of steam through the cap member 20 and to the environment. The ventilation hole 21 is configured to extend through cap member 20, e.g., from an exterior surface of the cap member 20 to an interior surface of cap member 20. A single ventilation hole 21 may be located off-centered on the cap member 20 to prevent interference with the support member arm 25. Embodiments, however, are not limited to one ventilation hole 21, and thus, may encompass a plurality of ventilation holes 21 located at varying locations on the cap member 20 and which permits practice of embodiments as described herein. Alternatively, the cap member 20 may not have any ventilation holes 21.

As illustrated in FIGS. 1 and 8, the support member 22, 122 comprises a support member arm 25, 125 and a support member base 26, 126. The support member arm 25, 125 extends in a longitudinal direction from a central interior surface of the cap member 20, 120 towards the interior space of the drinking vessel 40, 140 where it terminates to the support member base 26, 126. Although the illustrated embodiments depict the support member 22, 122 having a design in which it is integrated into the upper region of the cap member 20, 120, embodiments are not limited thereto. For example, the support member 22, 122 may be removeably attached to the upper region of the cap member 20, 120 using any mechanical connection. Moreover, the support member 122 in the illustrated embodiment of FIG. 8 has a design in which the support member arm 125 is bifurcated and spaced apart between the upper region of the cover member 120 and the support member base 126. It bears noting that the illustrated embodiments of FIGS. 1 and 8 operate in the same manner.

In accordance with embodiments, the sealing member 30, 130 comprises a lower rim 31, 131 an interior step 32, 132, sealing rings 33, 133, and a tension web 34, 134.

As illustrated in FIGS. 1, 4, 7, and 8, the sealing rings 33, 133 are to effectively seal the liquid contents contained in the drinking vessel 40, 140 by gripping the interior wall of the vessel 40, 140. The sealing rings 33, 133 may vary in diameter to correspond to the inner diameter of the vessel 40, 140, and thereby ensure an adequate seal. This is also advantageous in instances where dimensional variations of the vessel 40 may require varying diameters of the sealing rings 33, 133. Such a variation, for example, may occur during the manufacturing of vessels 40, 140 composed of a ceramic material, because the material presents a challenge in maintaining perfectly consistent dimensions during production. Although the illustrated embodiments depict three sealing rings 33, embodiments are not limited thereto. For example, the sealing member 30 may comprise at least one sealing ring 33, 133, or as many sealing rings 33, 133 necessary to adequately seal the drinking vessel 40, 140. Similarly, the sealing rings 33, 133 that comprise more than one sealing ring 33, 133 are not required to have varied dimensions.

As illustrated in FIGS. 1 and 8, the sealing rings 33, 133 are composed of a material that facilitates flexing as the lid 10, 100 is pressed onto the drinking vessel 40, 140. The sealing rings 33, 133 secure the lid 10, 100 to the drinking vessel by gripping the interior wall of the vessel 40, 140 while also creating a seal between the lid 10, 100 and the drinking vessel 40, 140 to thereby prevent the liquid contents contained in the vessel 40, 140 from escaping or leaking from the vessel 40, 140.

Figure 6:
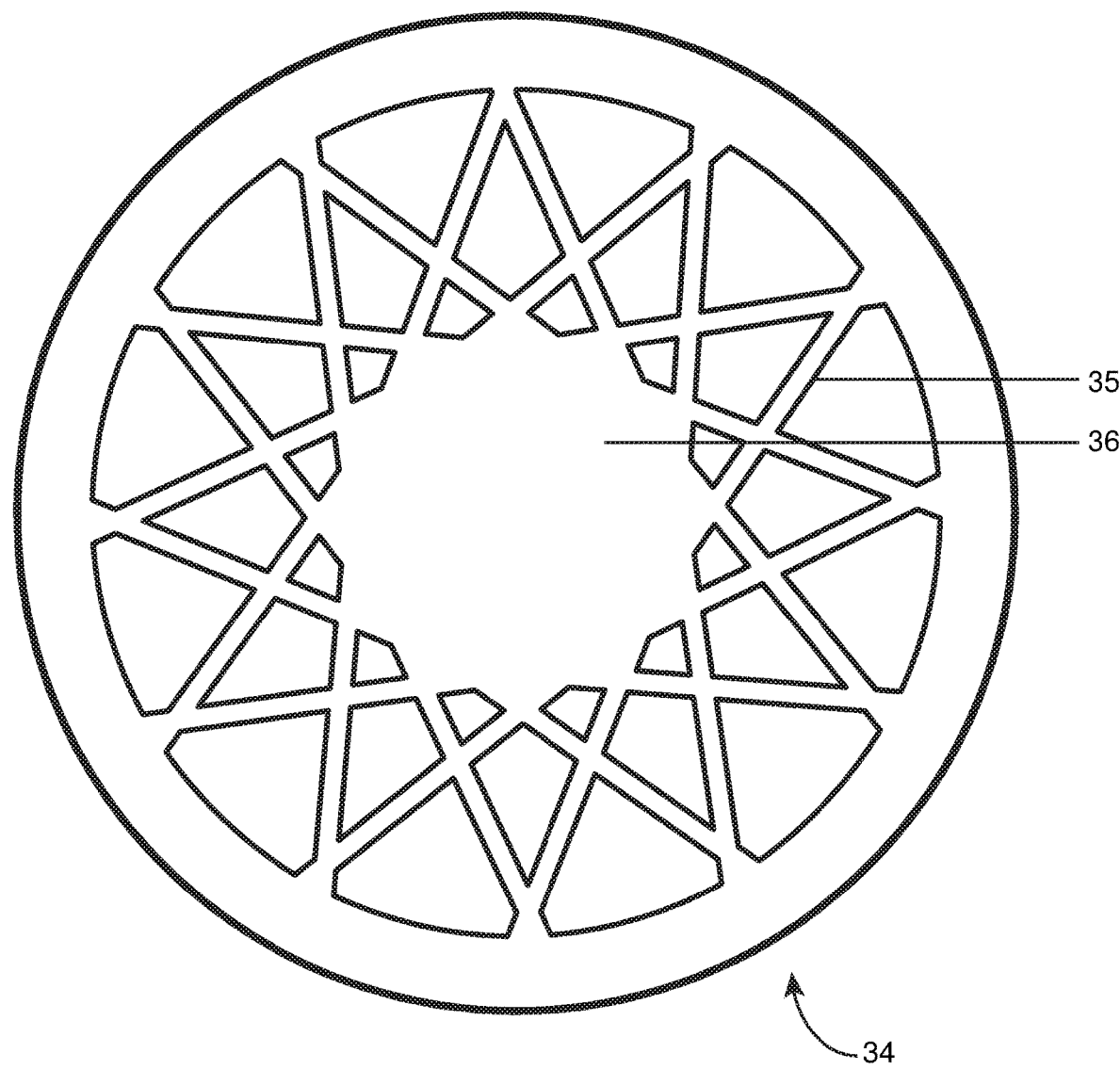
FIG. 6 illustrates a bottom view of a tension web of the sealing member of the lid of FIG. 1.
Figure 7:
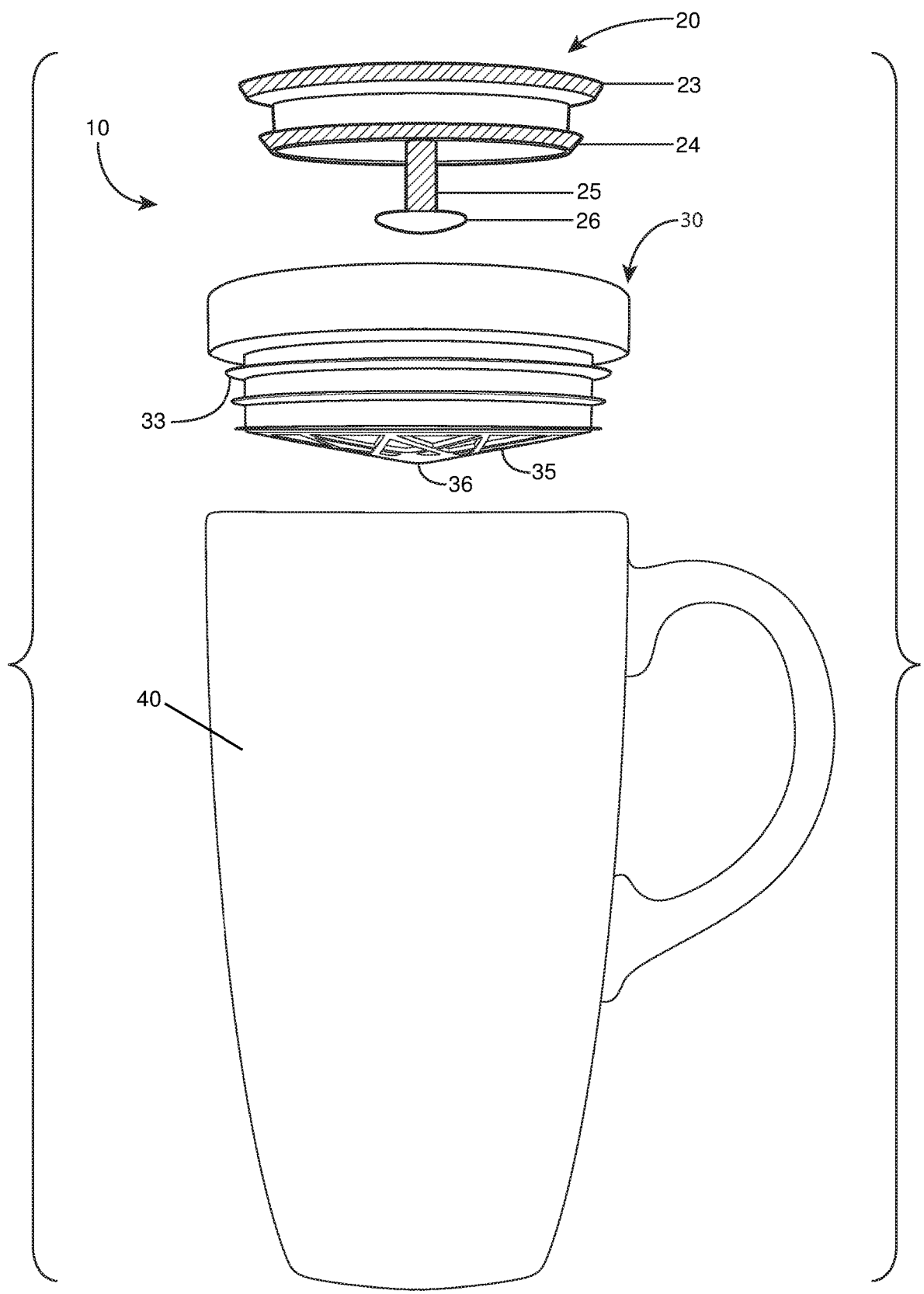
FIG. 7 illustrates an exploded view of the lid of FIG. 1.

As illustrated in FIGS. 6 and 8, the tension web 34, 134 may be comprised of a plurality of web extensions 35, 135 that extend radially outward from a central web surface 36, 136. The web extensions 35, 135 are radially symmetrical around the central web surface 36, 136. The cap 20, 120 and the sealing member 30, 130 are operatively connected at two contact regions. The first contact region is located where the interior shelf 24, 124 of the cap member 20, 120 directly contacts the interior step 32, 132 of the sealing member 30, 130. The second contact region is located where the support member base 26, 126 directly contacts the central web surface 36, 136 of the sealing member 30, 130. The symmetry of the tension web 38, 138 enables the tension web 34, 134 to evenly press against the support member base 26, 126 and maintain the seal between the cap member 20, 120 and the sealing member 30, 130 in the absence of force on the cap member 20 120. While the illustrated embodiments provide for radially symmetric web extensions, embodiments are not limited thereto, and may encompass other asymmetric arrangements that facilitate maintaining the seal between the cap member 20, 120 and the sealing member 30, 130.

The flexible nature of the sealing member 30, 130 facilitates movement of the cap member 20, 120 in upward and downward directions relative to the sealing member 30, 130, even in instances when the lid 10, 100 is not affixed to the drinking vessel 40, 140. The tension web 34, 134 of the sealing member 30, 130 is also in a flexed and/or stretched position, as it would appear if the cap member 20, 120 and the sealing member 30, 130 were attached to each other and the support member base 26, 126 was pushing in a downward direction on the central web surface 36, 136 of the tension web 34, 134.

As illustrated in FIGS. 1 and 8, when the cap member 20, 120 is in the seated position, the exterior surface of the cap member 20, 120 is to maintain a generally perpendicular position with respect to the outermost surface of the lower rim 31, 131 of the sealing member 30, 130. While the cap member 20, 120 is in the seated position, the interior shelf 24, 124 of the cap member 20, 120 and the interior step 32, 132 of the sealing member 30, 130 are to make $_{360}$-degree direct contact inside of the lid 10, 100. Further, while the cap member 20, 120 is in the seated position, the support member base 26, 126 is to make direct contact with the central web surface 36, 136 of the tension web 34, 134, thereby creating an evenly distributed and centered downward force on the tension web 34, 134.

Figure 9:
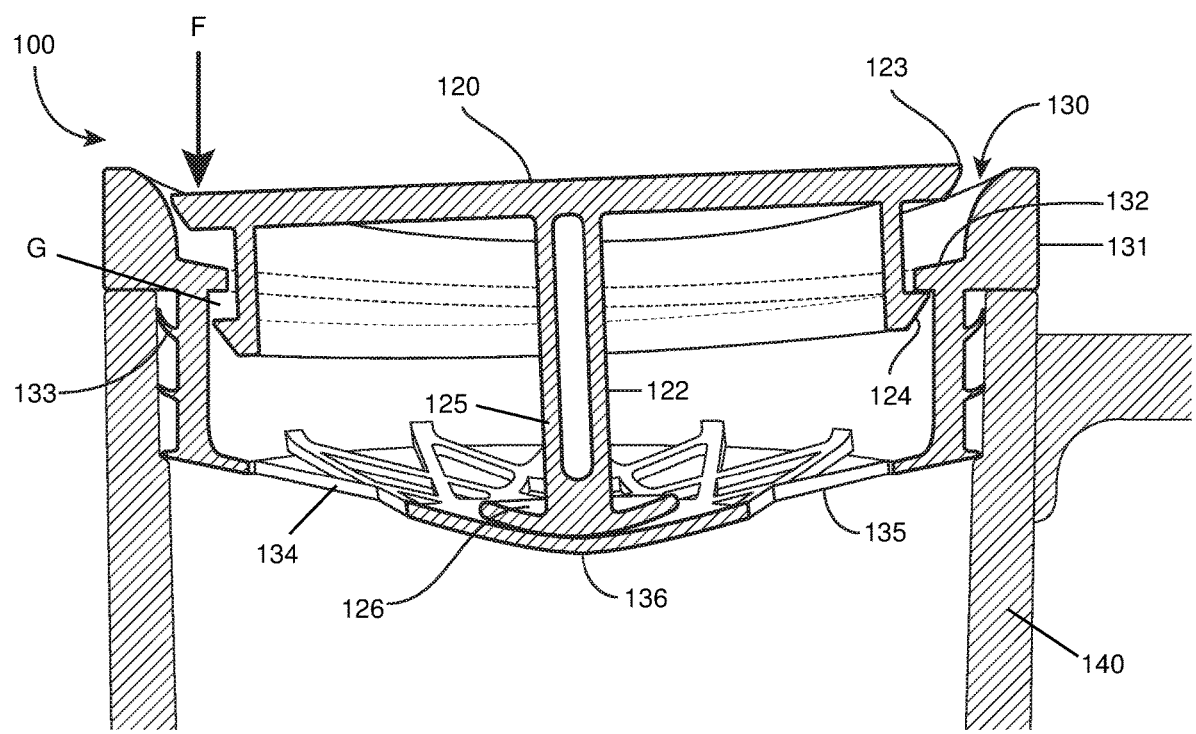
FIG. 9 illustrates a side sectional view of the lid of FIG. 8, with the lid in an operating position on a drinking vessel, with a cap member in an un-seated/un-sealed position relative to a seal member.

As illustrated in FIG. 9, the cap member 120 may be selectively moved from the seated position into at least a partially unseated position by repositioning at least one region of the interior shelf 124 of the cap member 120 from a seated position to an unseated position. This repositioning is caused by movement of the interior shelf 124 in a downward direction towards the interior of the vessel 140, thereby creating a gap G between the interior shelf 124 and the interior step 132 of the sealing member 130. Meaning, the interior shelf 124 and the interior step 132 are to make partial direct contact, i.e., less than 360-degree direct contact inside of the lid 100. The gap G represents the portion of the interior shelf 124 of and the interior step 132 that are not in contact. When the cap member 120 is selectively moved to a partially unseated position, the gap G is to facilitate a flow of the liquid contents contained in the drinking vessel 40 therethrough and directly into the mouth of the user. This gap G will be largest at the point on the lid 100 at which the user places its mouth and creates a force F via the upper lip of the user.

The cap 100 is selectively moved from the seated position to the unseated position, for example, by placement of the upper lip of the user on the lid 100 and a downwardly directed force F on any region on the uppermost surface of the cap member 120 between the center surface and the outer rim 123. For example, such force F may be placed at the outer rim 123 of the cap member 120. The force F is to thereby cause the cap member 120 to pivot about the longitudinal axis of the support member arm 125. This pivoting movement causes the uppermost surface of the cap member 120 to lose its perpendicular position in relation to the lower rim 131 of the sealing member 130. As the cap member 120 is pushed downwardly, the force F also causes the support member base 126 to exert a downwardly directed force on the central web surface 136 of the tension web 134. The tension web 134 thereby flexes and/or bends in response to this force. The cap member 120 is to selectively move from the seated position to the unseated position by cause of the force F exerted by the lip of the user because of the flexible nature of the tension web 134.

For example, the gap G may continue and gradually decrease in size moving away from the mouth contact point on both sides of the contact point. The interior shelf 124 and the interior step 132 will maintain their contact at the point 180-degrees from the mouth contact point. The gap G permits liquid to flow out of the vessel 140 and directly into the mouth of the user at the mouth-contact point when the drinking vessel 140 is tipped in a direction toward the user. The narrowing sides of the gap G also permit air to flow into the drinking vessel 140 as the user is drinking to prevent glugging and to aid a natural flow of the liquid contents.

Although the illustrated embodiments depict selective movement of the cap 100 from the seated position to the unseated position via a force F resulting from the upper lip of the user, embodiments are not limited thereto. For example, such force F may be exerted by any object other than the upper lip of the user provided it facilitates the creation of a gap G that permits flow of the liquid contents from the vessel 140.

The structural shape of the lid 10, 100 is not limited to the designs herein (for purposes of are illustrative only), and thus, may have an unlimited number of structural geometric shapes and configurations. Embodiments may also be adapted to prevent disassembly, where the cap member 20, 120 and the sealing member 30, 130 are permanently attached to each other. This permanent attachment may be maintained by an attachment between the support member 22, 122 of the cap member 20, 120 and the tension web 34, 134 of the sealing member 30, 130.

Additional Notes and Examples

Example One may include a lid for a drinking vessel, the lid comprising: a seal member for receipt by the drinking vessel, the seal member being configured to form an outer seal to seal liquid contents contained in the drinking vessel, the sealing member having an interior step, at least one sealing ring, and a tension web; and a cap member operatively connected to the seal member for selective movement between a seated position to form an inner seal to seal the liquid contents and at least a partially unseated position via a force applied in a downward direction against the cap member to create a gap that facilitates flow of the liquid contents through the lid and from the drinking vessel, the cap member having a support member, an outer rim, and an interior shelf.

Example Two may include the lid of Example One, wherein the outer rim and the interior shelf have different outer diameters and are spaced apart in a longitudinal direction to extend substantially concentrically relative to each other.

Example Three may include the lid of Example One, wherein the support member comprises a support member arm and a support member base.

Example Four may include the lid of Example Three, wherein the support member arm extends in a longitudinal direction from a central interior surface of the cap member towards the interior space of the drinking vessel and terminates into the support member base.

Example Five may include the lid of Example One, wherein the at least one sealing ring defines the outer seal at an interface between the interior wall of the seal member and the drinking vessel.

Example Six may include the lid of Example One, wherein the tension web comprises a central web surface and a plurality of web extensions that extend radially outward in a symmetrical manner from the central web surface.

Example Seven may include the lid of Example One, wherein in a seated position of the cap member, the interior shelf of the cap member and the interior step of the sealing member make 360-degree direct contact to thereby define the inner seal.

Example Eight may include the lid of Example One, wherein in the at least partially unseated position of the cap member, the interior shelf of the cap member and the interior step of the sealing member make less than 360-degree direct contact to thereby define the gap.

Example Nine may include the lid of Example One, wherein contact between the support member base and the tension web is to maintain the inner seal.

Example Ten may include the lid of Example One, wherein the downwardly directed force on the outer rim of the cap member causes the cap member to pivot about the longitudinal axis of the support member arm to create the gap.

Example Eleven may include a lid for a drinking vessel, the lid comprising: a seal member for receipt by the drinking vessel, the seal member including an interior step, a tension web, and a plurality of sealing rings configured to form an outer seal to seal liquid contents contained in the drinking vessel; and a cap member operatively connected to the seal member, the cap member including: (i) an interior shelf configured to make 360-degree direct contact with the interior step to form an inner seal to seal liquid contents contained in the drinking vessel in a seated position of the cap member to define the inner seal, and (ii) an outer rim configured to selectively move the cap member to at least a partially unseated position upon receipt of a downwardly directed force on the outer rim, to thereby create a gap between the interior shelf and the interior step that facilitates flow of the liquid contents through the lid and from the drinking vessel.

Example Twelve may include the lid of Example Eleven, wherein the outer rim and the interior shelf have different outer diameters and are spaced apart in a longitudinal direction to extend substantially concentrically relative to each other.

Example Thirteen may include the lid of Example Eleven, wherein the cap member further includes a support member having a support member arm that extends in a longitudinal direction from a central interior surface of the cap member towards the interior space of the drinking vessel and terminates into a support member base.

Example Fourteen may include the lid of Example Thirteen, wherein the downwardly directed force on the outer rim causes the cap member to pivot downwardly about the longitudinal axis of the support member arm to create the gap.

Example Fifteen may include the lid of Example Fourteen, wherein a pivot point is defined by contact between the support member base and a central web surface of the tension web.

Example Sixteen may include the lid of Example Eleven, wherein the outer seal is formed at an interface between the interior wall of the seal member and the drinking vessel.

Example Seventeen may include the lid of Example Eleven, wherein the tension web comprises a plurality of web extensions that extend radially outward from a central web surface.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the description herein that the broad techniques of the embodiments may be implemented into a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE NUMERALS 10, 100 Lid
20, 120 Cap member
21 Ventilation hole
22, 122 Support member
23, 123 Outer rim
24, 124 Interior shelf
25, 125 Support member arm
26, 126 Support member base
30, 130 Seal member
31, 131 Lower rim
32, 132 Step
33, 133 Sealing rings
34, 134 Tension web
35, 135 Web extensions
36, 136 Central web surface
40, 140 Drinking vessel

What is claimed is:

1. A lid for a drinking vessel, the lid comprising:
a seal member for receipt by the drinking vessel, the seal member having an interior step, a tension web having a central web surface, and at least one sealing ring composed of flexible material and extending radially outwards from the interior step such that the at least one sealing ring is configured to, when the lid is placed in an operating position facilitate formation of a sealing connection which secures the lid to the drinking vessel, and also formation of at least one outer seal which seals liquid contents contained in the drinking vessel; and
a cap member operatively connected to the seal member for selective movement between a seated position to form an inner seal to seal the liquid contents and at least a partially unseated position via a force applied in a downward direction against the cap member to create a gap that facilitates flow of the liquid contents through the lid, the cap member having a support member, an outer rim, and an interior shelf, the support member comprising a support member base and a support member arm extending in a longitudinal direction from a central interior surface of the cap member to terminate into the support member base in a manner such that the downwardly directed force applied against the cap member causes the support member base to exert a downwardly directed force on the central web surface, thereby causing the cap member to pivot about the longitudinal axis of the support member arm.

2. The lid of claim 1, wherein the outer rim and the interior shelf have different outer diameters and are spaced apart in a longitudinal direction to extend substantially concentrically relative to each other.

3. The lid of claim 1, wherein the tension web comprises a plurality of web extensions that extend radially outward in a symmetrical manner from the central web surface.

4. The lid of claim 1, wherein in a seated position of the cap member, the interior shelf of the cap member and the interior step of the sealing member make 360-degree direct contact to thereby define the inner seal.

5. The lid of claim 1, wherein in the at least partially unseated position of the cap member, the interior shelf of the cap member and the interior step of the sealing member make less than 360-degree direct contact to thereby define the gap.

6. The lid of claim 1, wherein contact between the support member base and the tension web is to maintain the inner seal.

7. A lid for a drinking vessel, the lid comprising:
a seal member for receipt by the drinking vessel, the seal member including an interior step, a tension web having a central web surface, and a plurality of sealing rings composed of flexible material and extending radially outwards from the interior step such that the plurality of sealing rings are configured to, when the lid is placed in an operating position facilitate formation of a sealing connection which secures the lid to the drinking vessel, and also formation of outer seals at an interface which seals liquid contents contained in the drinking vessel; and
a cap member operatively connected to the seal member, the cap member including:
an interior shelf configured to make 360-degree direct contact with the interior step to form an inner seal to seal the liquid contents in a seated position of the cap member to define the inner seal,
an outer rim configured to selectively move the cap member to at least a partially unseated position upon receipt of a downwardly directed force on the outer rim, to thereby create a gap between the interior shelf and the interior step that facilitates flow of the liquid contents through the lid, and
a support member comprising a support member base and a support member arm extending in a longitudinal direction from a central interior surface of the cap member to terminate into the support member base in a manner such that the downwardly directed force applied against the outer rim causes the support member base to exert a downwardly directed force on the central web surface, thereby causing the cap member to pivot about the longitudinal axis of the support member arm.

8. The lid of claim 7, wherein the outer rim and the interior shelf have different outer diameters and are spaced apart in a longitudinal direction to extend substantially concentrically relative to each other.

9. The lid of claim 7, wherein a pivot point is defined by contact between the support member base and the central web surface of the tension web.

10. The lid of claim 7, wherein the tension web comprises a plurality of web extensions that extend radially outward from a central web surface.

11. A lid for a drinking vessel, the lid comprising:
a seal member for receipt by the drinking vessel, the seal member including a tension web having a central web surface, and a plurality of radial sealing rings configured to, when the lid is placed in an operating position, facilitate formation of a sealing connection which secures the lid to the drinking vessel, and also formation of outer seals;
a cap member, operatively connected to the seal member, and configured for, when the lid is placed in the operating position, selective movement between a seated position which causes the seal member to seal liquid contents in the drinking vessel and at least a partially unseated position via a force applied in a downward direction against the cap member to create a gap that facilitates flow of the liquid contents through the lid; and
a support member, comprising a support member base and a support member arm, the support member arm extending in a longitudinal direction from a central interior surface of the cap member to terminate into the support member base in a manner such that the downwardly directed force applied against the cap member causes the support member base to exert a downwardly directed force on the central web surface, thereby causing the cap member to pivot about a pivot point defined by contact between the support member base and the central web surface.

* * * * *